Nov. 6, 1951             A. E. BRYCE             2,574,014
SLIDE FASTENER FOR DETACHABLY ATTACHING
BUTTONS TO FABRIC AND THE LIKE
Filed Jan. 17, 1949
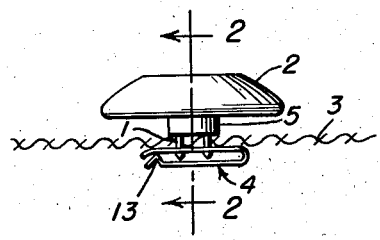
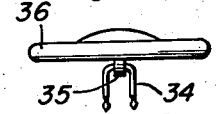
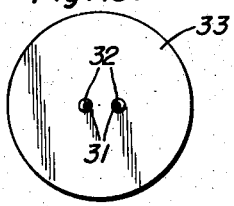
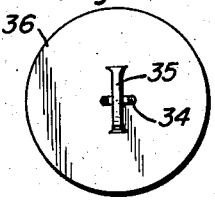
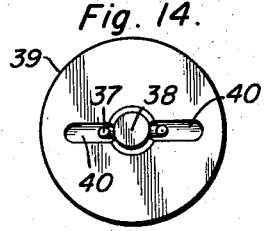
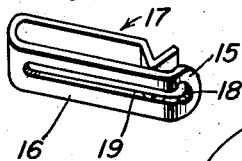
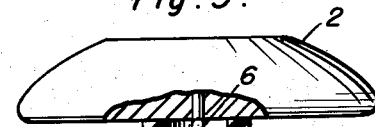
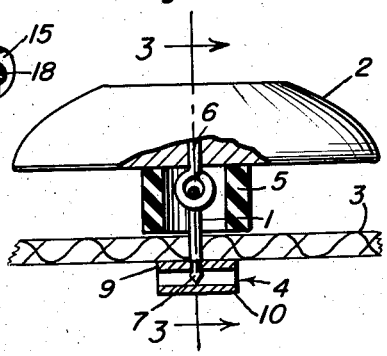
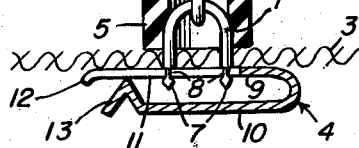
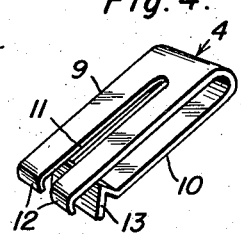
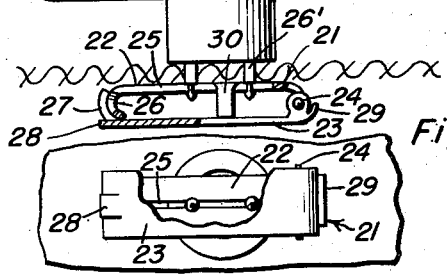
Inventor
Allan E. Bryce
By Clarence A. O'Brien
and Harvey B. Jacobson
Attorneys Patented Nov. 6, 1951

2,574,014

UNITED STATES PATENT OFFICE 2,574,014

SLIDE FASTENER FOR DETACHABLY ATTACHING BUTTONS TO FABRIC AND THE LIKE

Allan E. Bryce, Providence, R. I.

Application January 17, 1949, Serial No. 71,288

2 Claims. (Cl. 24—104)

1

My invention relates to improvements in slide fasteners for detachably attaching buttons to fabric and other material.

The primary object of the invention is to provide a simple form of strong, durable fastener whereby buttons may be easily and quickly attached to or detached from fabric, or other material, and which will prevent loss of buttons, particularly by being torn out of the fabric or material, the fastener being especially adapted for use with various different types of buttons and for attachment without injuriously pinching or otherwise damaging the fabric.

Other and subordinate objects, within the purview of my invention, together with the precise nature of my improvements will be readily understood when the succeeding description and claims are read with reference to the drawing accompanying and forming a part of this specification.

In said drawing:

Figure 1 is a view in side elevation, partly in section, illustrating my improved fastener in a preferred embodiment thereof attached to one type of button;

Figure 2 is a view in vertical transverse section taken on the line 2—2 of Figure 1 and drawn to a larger scale;

Figure 3 is a similar view taken on the line 3—3 of Figure 2;

Figure 4 is a view in perspective of the slide member in the preferred embodiment thereof drawn to a still larger scale;

Figure 5 is a similar view of a modified embodiment of the slide member drawn to a smaller scale;

Figure 6 is a view in side elevation, partly in section, of a modified embodiment of my improved fastener;

Figure 7 is a fragmentary view in bottom plan, partly broken away;

Figure 8 is a view in perspective of the slide member of the modified embodiment of the fastener;

Figure 9 is a view in side elevation illustrating the coupling member attached to another type of button;

Figure 10 is a view in bottom plan, partly in section, of the same;

Figure 11 is a view in side elevation illustrating the coupling member attached to another type of button;

Figure 12 is a view in buttom plan of the same;

Figure 13 is a view in side elevation illustrating the coupling member attached to still another type of button; and

2

Figure 14 is a view in bottom plan of the same.

Referring to the drawing by numerals, and first to Figures 1, 2 and 3, in the preferred embodiment thereof, the fastener of my invention comprises a U-shaped coupling member 1 attached to the button 2 with its ends piercing the fabric 3; a slide member 4 interlocking, in a manner presently described, with the ends of the coupling member 1 on the side of the fabric 3 opposite the button 2, and a resilient, compressible, spacing sleeve 5, of rubber, or the like, interposed between the button 2 and the fabric 3 in surrounding, concealing relation to the coupling member 1 and urging the button 2 away from the fabric 3 to exert tension against said members 1 and 4 and cause the slide member 4 to tightly hug the fabric 3 and the button 2 to fit tightly against said sleeve.

The coupling member 1, as illustrated in Figures 1 to 3, is attached to a conventional type of button 2 having an axial eye member 6 protruding from the back of the button and through which the coupling member 1 is slidably and swingably inserted, with the coupling member 1 and eye member 6 concealed in the spacing sleeve 5. As will be understood, the button 2 is seated on the spacing sleeve 5 and may be tilted on said sleeve and relative to the coupling member 1 in inserting the button 2 in a button-hole, not shown.

The coupling member 1 is provided with terminal knobs 7 of a suitable shape for easy insertion through the fabric 3 and with circumferential grooves 8 adjoining said knobs 7 and serving a purpose presently seen.

The slide member 4 is formed in a single piece of flat, resilient metal, and is of elongated U-shape, or loop form, with a pair of normally parallel, relatively long and short legs 9, 10 spaced apart in opposed relation. The long leg 9 is opposed to the fabric 3 and longitudinally slotted, or bifurcated, as at 11, from its free end, the slot 11, or bifurcation, providing for entering the ends of the coupling member in said leg 9 by sliding said leg onto said ends of the coupling member 1 in straddling relation thereto. The width of the slot 11, forming the bifurcation, is such that said leg 9 slidably fits in the grooves 8 in interlocking engagement therewith to prevent the coupling member 1 from pulling out of the fabric 3. Terminal lips 12 on the free end of the furcations of the long leg 9, bent toward the short leg 10, permit said leg 9 to be slid along the fabric 3 without snagging the fabric.

The short leg 10 of the slide member 4 is crimped to form a V-shaped, transverse terminal rib 13 normally engaging the long leg 9 adjacent the outer end of the slot, or bifurcation 11, to yieldingly prevent the short leg 9 from being pulled off the coupling member 1. Thus the slide member 4 is yieldingly locked on the coupling member 1 by closing the entrance end of slot 11.

As will be seen, the slide member 4 may be attached to the coupling member 1 by sliding the long leg 11 onto said member 1, in the manner described, the rib 13 wiping over and past the knobs 7, in the attaching operation, and then engaging the long leg 11, under reaction of the short leg 10, to lock the slide member 4 attached, in the manner described. To detach the slide member 4, it is merely necessary to pull the long leg 11 off the coupling member 1. During this operation, the lip 13 wipes over and past the knobs 7 in the same manner as in the attaching operation.

In attaching the button 2 by means of the described fastener, the coupling member 1 is first attached to the eye member 6 and the spacing sleeve 5 is then positioned over the coupling member 1, and said member 6. The ends of the coupling member 1 are then forced through the fabric 3, and the slide member 4 attached in the manner already described. When the slide member 4 has been detached, the coupling member 1 may be pulled out of the fabric 3, by grasping the button 2.

In the modified embodiment of the slide member illustrated in Figure 5, a terminal lip 15, corresponding in function to the lips 12, is provided on the long leg 16 of the slide member 17 and connecting the furcations of said leg for reinforcing purposes with the entrance end 18 of the entrance slot 19 extending at an angle into the lip 15 to permit the knobs 7 to pass into and out of said slot 16. Otherwise, the construction is the same as described with reference to the preferred embodiment of the invention.

In the modified embodiment of the fastener illustrated in Figures 6, 7, and 8, a slide member 21 is provided comprising a pair of opposed, resilient legs 22, 23 hinged together at one end of said member, as at 24, to swing into parallel spaced apart relation. The leg 22 is provided with a longitudinal entrance slot, or bifurcation, as at 25, for attaching the slide member 21, in the same manner as in the preferred embodiment of the invention. The free ends of the legs 22, 23 are curved to form hooked terminal lips 26, 27 coacting, with a snap action, when the legs 22, 23 are swung into parallel relation to interlock and yieldingly lock the legs in such relation. The lip 27 of the leg 23 is arranged to close the entrance end of the entrance slot, or bifurcation, 25 when said legs are interlocked in parallel relation and prevent the slide member 21 from being pulled off the ends of the coupling member, designated 26' in this instance. A finger grip 28 on the free end of the leg 23 is provided to facilitate swinging said leg away from the other leg 22 to open the entrance end of the entrance slot, or bifurcation, 25 so that the slide fastener 21 may be detached by pulling the same off the coupling member 26'. A similar, stop lug 29 on the hinged end of the leg 23 is adapted to coact with the hinged end of the leg 22 to limit swinging of the leg 23 away from the leg 22. A pair of side edge stop lugs 30 on the leg 22 are adapted to engage the other leg 23 when said legs are in parallel relation, to prevent said legs from being bent inwardly after the slide member 21 is attached. Otherwise, the construction and arrangement is the same as that described with reference to the preferred embodiment of the invention.

A particular advantage of my improved fastener is that it may be used with various types of conventional buttons to which the coupling member may be easily attached. For instance, as shown in Figures 9 and 10, the coupling member, designated 31, may be inserted through the usual pair of thread holes 32 in a button 33. As shown in Figures 11 and 12, such a coupling member, designated 34, may be inserted through an apertured lug 35 on the back of another type of button 36. As shown in Figures 13 and 14, such a coupling designated 37 may be inserted in an apertured lug 38 on the back of a button 39 provided with bottom grooves 40 at opposite sides of the lug.

The foregoing will, it is believed, suffice to impart a clear understanding of my invention, since the construction, use and advantages of the invention will be apparent therefrom.

Manifestly, the invention, as described, is susceptible of modification, without departing from the inventive concept, and right is herein reserved to such modifications as fall within the scope of the appended claims.

Having described my invention, what is claimed as new is:

1. A fastener for detachably securing a button to one side of a piece of fabric comprising a U-shaped coupling member attached to the button with ends piercing the fabric and transversely grooved on the other side of the fabric, and a slide member bent into elongated loop form with a pair of legs one of which is formed with a slot extending from one end inwardly past the center of said leg to fit in said grooves and straddle said ends of the coupling member in interlocking engagement therewith to prevent said coupling member from pulling out of the fabric, said slot having an open entrance end whereby said slide member may be slid onto said ends of the coupling member, the other leg of said slide member having a free end engaging the slotted leg and bridging and closing said entrance end of the slot to prevent said slide member from sliding off said ends of the coupling member, said legs of said slide member being resiliently connected for flexing to disengage said free end from said slotted leg for opening the entrance end of the slot to provide for entering said ends of the coupling member in the slot and being reactive toward each other to normally engage said free end with said slotted leg and bridge and close said entrance end of the slot.

2. A fastener for detachably securing a button to one side of a piece of fabric comprising a U-shaped coupling member attached to the button with ends piercing the fabric and transversely grooved on the other side of the fabric, and a sliding member of elongated loop form with a pair of legs one of which is formed with a slot extending from one end inwardly past the center of said leg to fit in said grooves and straddle said ends of the coupling member in interlocking engagement therewith to prevent said coupling member from pulling out of the fabric, said slot having an open entrance end whereby said slide may be slid onto said ends of the coupling member, the other leg of said slide member having a free end for engagement with said slotted leg at the entrance end of said slot to close said entrance end and prevent the slide from sliding off said ends of the coupling member, said other leg being swingably connected at its other end to the other end of the slotted leg for movement of said free end into engagement with said slotted leg, said slotted leg having its ends bent toward the other leg to curve away from the fabric and prevent said slotted leg from snagging the fabric.

ALLAN E. BRYCE.

REFERENCES CITED

The following references are of record in the file of this patent:

UNITED STATES PATENTS

| Number | Name | Date |
|---|---|---|
| 45,000 | Gengembre | Dec. 13, 1864 |
| 1,216,535 | Zak | Feb. 20, 1917 |
| 2,174,518 | Kors | Oct. 3, 1939 |

FOREIGN PATENTS

| Number | Country | Date |
|---|---|---|
| 553,927 | Great Britain | June 10, 1943 |